United States Patent [19]
Levy et al.

[11] Patent Number: 5,596,658
[45] Date of Patent: Jan. 21, 1997

[54] METHOD FOR DATA COMPRESSION

[75] Inventors: Robert B. Levy, Morrisville, Pa.; Rajarshi Ray, Princeton, N.J.

[73] Assignee: Lucent Technologies Inc., Murray Hill, N.J.

[21] Appl. No.: 69,321

[22] Filed: Jun. 1, 1993

[51] Int. Cl.$^6$ .................................................. G06K 9/36
[52] U.S. Cl. ......................... 382/243; 382/245; 382/252; 348/384
[58] Field of Search ............................. 382/56, 22, 23, 382/49; 348/384, 397; 395/2

[56] References Cited

U.S. PATENT DOCUMENTS

| | | | |
|---|---|---|---|
| 4,771,474 | 9/1988 | Takashima et al. | 382/56 |
| 5,127,063 | 6/1992 | Nishiya et al. | 382/8 |

OTHER PUBLICATIONS

Tretter, *Discrete–Time Signal Processing*, John Wiley & Sons pp. 355–358 (1976).
Neagoe, "Predictive Ordering and Linear Approximation for Image Data Compression", IEEE Trans. on Comm, vol. 36, No. 10, pp. 1179–1182 (1988).

*Primary Examiner*—Leo Boudreau
*Assistant Examiner*—David R. Anderson, Jr.
*Attorney, Agent, or Firm*—Robert B. Levy

[57] ABSTRACT

Compression of a plurality of signal samples $y(t_0), y(t_1), y(t_2) \ldots y(t_z)$ may be accomplished by performing a first linear regression to obtain a curve fitted thereto which is represented by a polynomial having a first set of coefficients $(a_0, a_1, a_2, a_3 \ldots a_n)$ which is stored in memory (18) or transmitted by a transmitter (20). The error between each of the actual signal samples $(y(t_0), y(t_1), y(t_2) \ldots y(t_z))$ and the value approximated by the curve fitted to the values is computed and then thresholded. A second regression analysis is then performed to fit a curve, having a second set of coefficients $(b_0, b_1, b_2, b_3 \ldots b_q)$ to the thresholded error values. The second set of coefficients is also stored or transmitted and used, in conjunction with the first set of coefficients, to closely approximate the original set of signal samples.

4 Claims, 2 Drawing Sheets

METHOD FOR DATA COMPRESSION

TECHNICAL FIELD

This invention relates to a technique for compressing data, and more particularly, for compressing a set of signal samples, each representative of the amplitude of an analog signal at a particular instant in time.

BACKGROUND OF THE INVENTION

The processing and/or storage of an analog signal, such as an analog video signal, by a digital electronic system invariably requires conversion of the signal to a digital one by sampling the analog signal amplitude at periodic intervals and converting each sampled analog to a representative digital value. Depending on the desired degree of resolution, a large number of samples may be taken. Storage of a large number of signal samples (in the form of digital values) necessarily requires a large memory. Often the required memory capacity may not be available and, therefore, the signal samples must be compressed (i.e., reduced). Another advantage of compression may be found in data transmission. Transmitting a set of samples takes a finite time. Compressing the data can reduce transmission time, which is thus advantageous.

One approach to accomplishing data compression is to employ a least-squares type of regression analysis to fit the signal samples to a polynomial of the form $a_0t^0+a_1t^1+a_2t^2 \ldots a_nt^n$ where n is an integer representing the degree of the polynomial, and t represents the time interval for a given sample. Rather than store or transmit the signal samples themselves, the coefficients $a_0,a_1,a_2 \ldots a_n$ are stored or transmitted instead. A desired signal sample at a corresponding time interval can be approximated from the polynomial.

The accuracy of such an approach is dependent on the value of n. By making n large, approximated signal sample values will correspond more closely to the true signal sample. However, making n too large (where n is on the order of the actual number of signal samples) defeats the entire purpose of compression altogether. Additionally, making n very large makes the least-squares regression analysis difficult to perform.

Thus, there is a need for a technique which allows for data compression while still maintaining high accuracy.

SUMMARY OF THE INVENTION

Briefly, in accordance with a preferred embodiment of the invention, there is disclosed a technique for compressing data, and particularly, a set of analog signal samples. To accomplish compression, an analog signal is first sampled at periodic intervals to obtain a set of signal samples. A least-squares regression analysis is performed to fit the signal samples to a polynomial of the form $a_0t^0+a_1t^1+a_2t^2 \ldots a_nt^n$ (where n is an integer, typically, although not necessarily 2, 3 or 4). After performing such a regression analysis, the error (i.e., the difference) between each actual signal sample and the value given by the regression analysis is determined. A weighted least-squares linear regression analysis is performed to fit the error values (which are typically thresholded) to a polynomial whose coefficients are given by $b_0t^0+b_1t^1+b_2t^2 \ldots b_qt^q$ (where q is an integer). Once the first and second regression analyses have been performed, then the coefficients $a_0,a_1,a_2,a_3 \ldots a_n$ and $b_0,b_1,b_2,b_3 \ldots b_n$ (or their sum) are stored or transmitted in place of the signal samples. The coefficient sum is given by $c_oa_o+b_o, c_1=a_1+b_1$, etc.

To obtain a set of signal samples from which the original analog signal can be accurately approximated, the coefficients $a_0,a_1,a_2,a_3 \ldots a_n$ and $b_0,b_1,b_2,b_3 \ldots b_n$ are retrieved. Thereafter, an approximated signal sample at a given time t is established in accordance with the polynomial $a_0t^0+a_1t^1+a_2t^2 \ldots a_nt^n$. Next, the error associated with that approximated signal sample at a given time is obtained from the polynomial $b_0t^0+b_1t^1+b_2t^2 \ldots b_qt^q$. The sum of the approximated data value and the error yields a better approximation for the signal sample. The approximated signal can also be retrieved simply from a set of coefficients $c_0,c_1,c_2 \ldots c_n$ which represents the sums of $a_o+b_o, a_1+b_1, a_2+b_2 \ldots a_n+b_n$. This process is repeated for different times (different t's) to obtain a better approximated signal sample set. This signal sample set yields a good reproduction of the original analog signal.

DETAILED DESCRIPTION

Figure 1:
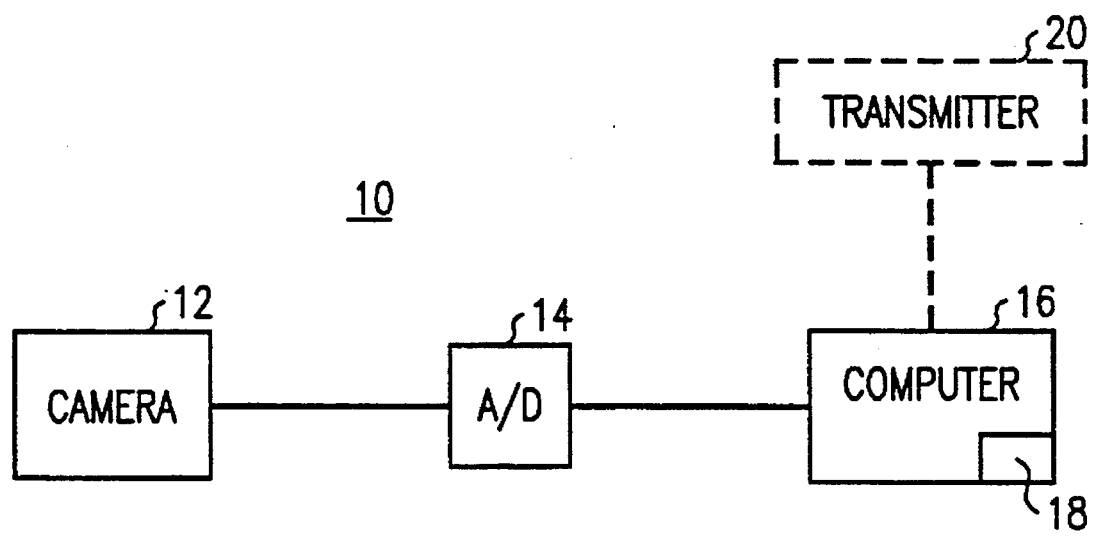
FIG. 1 is a block diagram of a prior art electronic system which generates an analog signal that is digitized for processing by a digital computer.

To best understand the data compression method of the present invention, the method will be discussed in terms of compressing a set of signal samples of an analog signal. It should be understood that the method is applicable for compressing other types of data. Referring to FIG. 1, there is shown a prior art electronic system 10 which generates an analog signal and thereafter converts the signal to a digital signal. The system 10 comprises an analog signal generating element 12, which has been depicted as a video camera, although it should be understood that the element 12 could comprise another type of analog signal generator. The analog signal generated by the camera 12 is converted into a digital signal by an analog-to-digital conversion device 14 (i.e., an A/D converter) which operates to sample the analog signal generated by the camera at periodic time intervals and generates a digital value indicative of the analog signal amplitude at each sampling interval. The digital values are supplied to a computer 16, typically a machine vision processor, for processing. Included within the computer 16 is a memory 18 for storing the digital values which are passed thereto. As indicated in FIG. 1, a transmitter 20 (shown in phantom) may be coupled to the computer 16 for transmitting the signal samples which are passed thereto.

Figure 2:
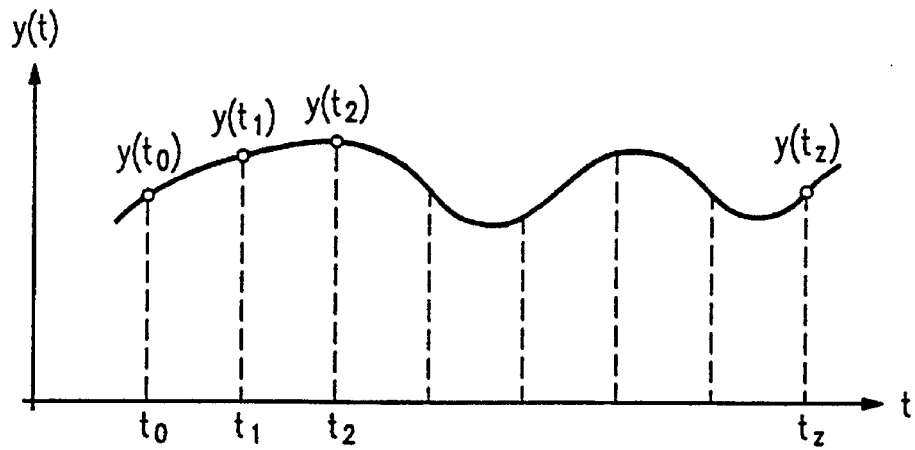
FIG. 2 is a plot of the analog signal produced by the apparatus of FIG. 1.

Referring now to FIG. 2, there is shown a plot of the analog signal produced by the camera 12 as a function of time. For reference purposes, the signal is depicted by the function y(t). The values $y(t_0),y(t_1),y(t_2) \ldots y(t_z)$ shown in FIG. 2 each represent a sample of the amplitude of the signal y(t) at a separate one of the intervals $t_0,t_1,t_2 \ldots t_z$, respectively, where z is an integer. In practice, the samples are obtained by the A/D converter 14 of FIG. 1 and are supplied to the computer 16 of FIG. 1 where they would ordinarily be stored in the memory 18 and/or transmitted by the transmitter 20.

Rather than store or transmit the individual samples $y(t_0), y(t_1), y(t_2) \ldots y(t_z)$, it is desirable to compress (i.e., reduce) them. One simplistic technique is to employ least-squares regression analysis. Referring to FIG. 2, a polynomial of the form:

$$f(t) = a_0 + a_1 t + a_2 t^2 + a_3 t^3 \ldots a_n t^n \quad (1)$$

(where n is an integer) can be fitted to the signal samples $y(t_0), y(t_1), y(t_2) \ldots y(t_z)$. Thus the signal samples $y(t_0), y(t_1), y(t_2) \ldots y(t_z)$ can be represented by a smaller set of polynomial coefficients $a_0, a_1, a_2, a_3 \ldots a_n$. The coefficients $a_0, a_1, a_2, a_3 \ldots a_n$ can be readily obtained by methods known in the art. Typically such regression analysis would be performed by the computer 16 of FIG. 1 and the coefficients would be stored in the computer memory 18 of FIG. 1 and/or transmitted by the transmitter 20.

The accuracy of this compression technique depends in large measure on n, the number of coefficients obtained by regression analysis. Making n large permits equation (1) to more accurately approximate each of the signal samples $y(t_0), y(t_1), y(t_2) \ldots y(t_z)$. However increasing the number n of coefficients $a_0, a_1, a_2, a_3 \ldots a_n$ increases the overall amount of storage needed in the memory 18 of FIG. 1 to store the coefficients and also increases the computation complexity associated with the regression analysis, thereby lessening the advantage obtained by compressing the signal samples in this manner. A good trade-off between accuracy and storage capacity is obtained by choosing n to be 2, 3 or 4.

Figure 3:
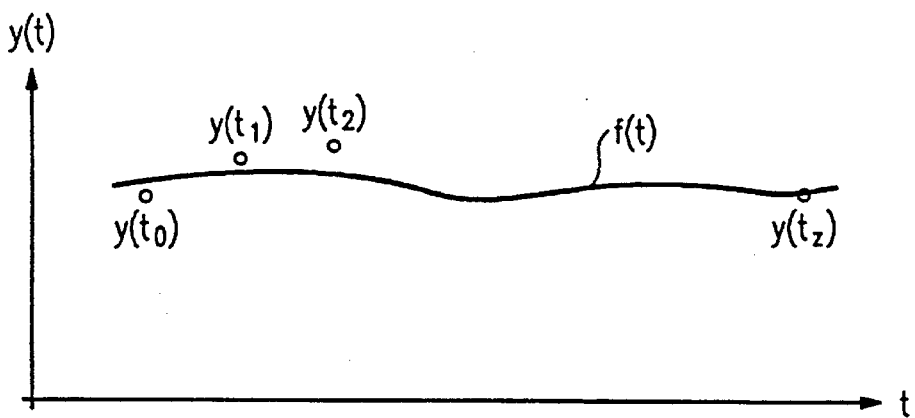
FIG. 3 is a graphical plot of a polynomial which has been fitted to a set of samples of the signal of FIG. 2.

Referring to FIG. 3, there is shown a plot of the curve f(t) versus the individual signal samples $y(t_0), y(t_1), y(t_2) \ldots y(t_z)$. As may be appreciated, the curve f(y) may represent the low-frequency elements. The curve may not necessarily go through each and every one of the signal samples, especially the points corresponding to the high-frequency elements. The difference (i.e., the error) between the curve f(t) and each of the actual signal samples $y(t_0), y(t_1), y(t_2) \ldots y(t_z)$ represents the error associated with accomplishing compression by means of the regression analysis performed.

We have discovered that the error between the curve f(t) and each of the signal samples $y(t_0), y(t_1), y(t_2) \ldots y(t_z)$ can be used to compensate for any inaccuracy so as to obtain more accurate data compression. To improve the data compression accuracy, the error between the curve f(y) and each of the signal samples $y(t_0), y(t_1), y(t_2) \ldots y(t_z)$ is measured in accordance with the relationship:

$$e(t_i) = y(t_i) - f(t_i) \quad (2)$$

where $t_i$ corresponds to a particular sampling interval.

Once the individual errors (i.e., the $e_i$'s) have been obtained, a weighted, least-squares regression analysis is performed on the error values to fit them to a polynomial of the form:

$$f(t_i|_e) = b_0 + b_1 t + b_2 t^2 \ldots b_q t^q \quad (3)$$

where q is an integer likely to be greater than n. The weights are such that more weight is given to the zero and low order terms and less weight to the higher order error terms.

Using equations (1) and (3), each actual signal sample value $y(t_i)$ can now be more closely approximated by the sum of $f(t_i)$ and $f(t_i|_e)$. By determining $f(t_i)$ and $f(t_i|_e)$ for a number of $t_i$'s, a set of more accurately approximated signal samples can be obtained from which the original analog signal y(t) can be approximated.

Figure 4:
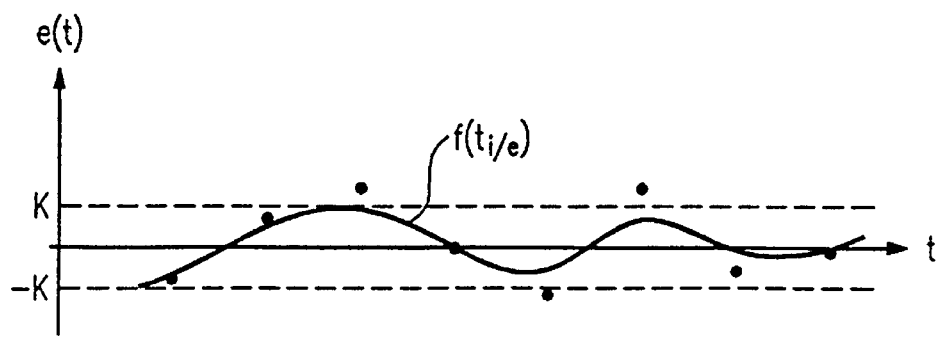
FIG. 4 is a graphical plot of a polynomial fitted to the difference between each of the signal samples of the signal of FIG. 2 and the approximated signal sample value given by the polynomial plotted in FIG. 3.

The accuracy of each signal sample obtained by the sum of $f(t_i)$ and $f(t_i|_e)$ depends on how large $f(t_i|_e)$ is. When $f(t_i|_e)$ is large, then $f(t_i)$ alone may indeed more closely approximate the signal sample $y(t_i)$ rather than the sum of $f(t_i)$ and $f(t_i|_e)$. To avoid this possible difficulty, it is desirable to threshold the error terms (i.e., the $e(t_i)$'s) before regression analysis. This may be accomplished as follows: For each signal sample value $f(t_i)$ given by equation (1), a determination is then made whether the error term $f(t_i|_e)$ associated with it is within a predetermined threshold range (i.e., between +K and −K in FIG. 4 where K is a prescribed value). If $f(t_i|_e)$ is outside this range, the outliers are removed from further consideration. A weighted regression analysis is performed as per equation (3). If the error term $f(t_i|_e)$ is within the prescribed band of values, then the signal sample will be better approximated by the sum of $f(t_i)$ and $f(t_i|_e)$ rather than by $f(t_i)$ alone. A run-length coding scheme, as is well-known in the art, may be used to track the number of instances (i.e., the particular $t_i$'s) for which the signal sample is better approximated by the sum of $f(t_i)$ and $f(t_i|_e)$ than $f(t_i)$ alone, based on the individual magnitudes of the error terms.

The foregoing discloses a technique for compressing an analog signal by sampling the signal and thereafter representing the signal samples in terms of a first and second set of polynomial coefficients $a_0, a_1, a_2, a_3 \ldots a_n$ and $b_0, b_1, b_2, b_3 \ldots b_q$ and a run length or the sum of the coefficients. The first set of coefficients corresponds to the coefficients of the polynomial obtained by performing a least-squares regression analysis to fit a curve to the signal samples. The second set of coefficients corresponds to the coefficients obtained by performing a weighted regression analysis on the thresholded error between the actual signal samples and the approximated value therefor obtained by the first linear regression analysis. The sum of the coefficients, given by the terms $c_0, c_1, c_2 \ldots$ is obtained from $a_0 + b_0, a_1 + b_1, b_2 + b_2 \ldots$ etc. In the event that q is larger than n, then the terms $c_{n+1}, c_{n+2} \ldots c_q$ will be given only by the b coefficients $b_{n+1}, b_{n+2} \ldots b_q$, respectively.

It is to be understood that the above-described embodiments are merely illustrative of the principles of the invention. Various modifications and changes may be made thereto by those skilled in the art which will embody the principles of the invention and fall within the spirit and scope thereof.

We claim:

1. A method for storing an analog signal y(t) in a compressed form and for reproducing said signal, comprising the steps of:

(a) sampling the analog signal y(t) at periodic intervals to yield a set of signal samples $y(t_0), y(t_1), y(t_2) \ldots y(t_z)$, each representing the amplitude of the analog signal at one of a plurality of corresponding time intervals $t_0, t_1, t_2 \ldots t_z$, respectively;

(b) performing a first regression analysis on the signal samples $y(t_0), y(t_1), y(t_2) \ldots y(t_z)$ to fit them to a curve given by a first polynomial of the form $f(t) = a_0 + a_1 t + a_2 t^2 + \ldots a_n t^n$;

(c) passing each of the coefficients $a_0, a_1, a_2 \ldots a_n$ of the first polynomial to a memory for storage;

(d) measuring each of a set of errors $e(t_1), e(t_2) \ldots e(t_z)$ between the curve given by the first polynomial and each of the original signal samples $y(t_0), y(t_1), y(t_2) \ldots y(t_z)$, respectively;

(e) thresholding the errors;

(f) performing a weighted regression analysis to fit each of the thresholded measured errors $e(t_1), e(t_2) \ldots e(t_z)$ to a second curve given by a second polynomial $f(t_i|_e) = b_0 + b_1 t + b_2 t^2 + b_3 t^3 + \ldots b_q t^q$;

(g) passing to the memory a second set of coefficients $b_0, b_1, b_2, b_3 \ldots b_q$;

(h) retrieving the coefficients $a_1, a_2 \ldots a_n$ and $b_0, b_1, b_2, b_3 \ldots b_q$ from the memory;

(i) determining an approximated signal amplitude value $y(t_i)$ for an interval $t_i$ from the first polynomial using the retrieved coefficient $a_1, a_2 \ldots a_n$;

(j) determining an approximate error value $e(t_i)$ for the interval $t_i$ from the second polynomial using the retrieved coefficients;

(k) compensating the approximated signal amplitude by adding the approximated error thereto;

(l) repeating the steps of (i), (j) and (k) for each of a plurality of different intervals (i.e., different $t_i$'s; and (m) establishing the original analog signal from the approximated analog signal amplitude.

2. The method according to claim 1 further including tracking the error in accordance with run length information obtained by determining the number of instances when the signal sample is better approximated by the approximated signal amplitude value alone.

3. The method according to claim 1 wherein the coefficients $a_0, a_1, a_2 \ldots a_n$ and $b_0, b_1, b_2 \ldots b_q$ are summed prior to passing to the memory.

4. The method according to claim 3 wherein the set of signal samples is retrieved by retrieving the sum of the coefficients.

* * * * *